US008280731B2

(12) United States Patent
Yu

(10) Patent No.: US 8,280,731 B2

(45) Date of Patent: Oct. 2, 2012

(54) NOISE VARIANCE ESTIMATOR FOR SPEECH ENHANCEMENT

(75) Inventor: Rongshan Yu, Singapore (SG)

(73) Assignee: Dolby Laboratories Licensing Corporation, San Francisco ( * ) Notice: Subject to any disclaimer, the term of this patent is extended or adjusted under 35 U.S.C. 154(b) by 387 days.

(21) Appl. No.: 12/531,690

(22) PCT Filed: Mar. 14, 2008

(86) PCT No.: PCT/US2008/003436

§ 371 (c)(1),
(2), (4) Date: Sep. 16, 2009

(87) PCT Pub. No.: WO2008/115435

PCT Pub. Date: Sep. 25, 2008

(65) Prior Publication Data

US 2010/0100386 A1 Apr. 22, 2010

Related U.S. Application Data

(60) Provisional application No. 60/918,964, filed on Mar. 19, 2007.

(51) Int. Cl.

| | |
|---|---|
| ***G10L 21/02*** | (2006.01) |
| ***G10L 15/00*** | (2006.01) |
| ***G10L 15/20*** | (2006.01) |
| ***G10L 11/06*** | (2006.01) |
| ***G10L 11/00*** | (2006.01) |

(52) U.S. Cl. ........ 704/226; 704/227; 704/233; 704/231; 704/210; 704/214; 704/215; 704/200

(58) Field of Classification Search .................. 704/226, 704/233, 231, 240, 227, 210, 214, 215, 200; 381/94.3

See application file for complete search history.

(56) References Cited

U.S. PATENT DOCUMENTS

| | | | | | |
|---|---|---|---|---|---|
| 5,706,395 | A * | 1/1998 | Arslan et al. | .................. | 704/226 |
| 6,289,309 | B1 | 9/2001 | Devries | | |
| 6,324,502 | B1 * | 11/2001 | Handel et al. | ................. | 704/226 |
| 6,415,253 | B1 * | 7/2002 | Johnson | ........................ | 704/210 |
| 6,453,285 | B1 * | 9/2002 | Anderson et al. | ............. | 704/210 |
| 6,757,395 | B1 * | 6/2004 | Fang et al. | ................... | 381/94.3 |
| 6,804,640 | B1 * | 10/2004 | Weintraub et al. | ............ | 704/226 |
| 6,910,011 | B1 * | 6/2005 | Zakarauskas | ................. | 704/233 |
| 7,742,914 | B2 * | 6/2010 | Kosek et al. | .................. | 704/205 |
| 2002/0055839 | A1 * | 5/2002 | Jinnai et al. | .................... | 704/240 |
| 2003/0177006 | A1 * | 9/2003 | Ichikawa et al. | .............. | 704/231 |
| 2003/0187637 | A1 * | 10/2003 | Kang et al. | ..................... | 704/226 |
| 2005/0119882 | A1 * | 6/2005 | Bou-Ghazale | ................ | 704/227 |
| 2005/0240401 | A1 | 10/2005 | Ebenezer | | |
| 2007/0055505 | A1 * | 3/2007 | Doclo et al. | .................. | 704/226 |

(Continued)

OTHER PUBLICATIONS

I. Cohen, "Noise spectrum estimation in adverse environments: Improved minima controlled recursive averaging", IEEE Trans. Speech and Audio Processino. vol. 11, No. 5 pp. 466-475, Sep. 2003.*

(Continued)

*Primary Examiner* — Douglas Godbold
*Assistant Examiner* — Edgar Guerra-Erazo

(57) ABSTRACT

A speech enhancement method operative for devices having limited available memory is described. The method is appropriate for very noisy environments and is capable of estimating the relative strengths of speech and noise components during both the presence as well as the absence of speech.

8 Claims, 3 Drawing Sheets

U.S. PATENT DOCUMENTS

2007/0055508 A1* 3/2007 Zhao et al. .................... 704/226
2010/0198593 A1* 8/2010 Yu ................................. 704/233

OTHER PUBLICATIONS

Ephraim, Y, et al., "Speech Enhancement Using a Minimum Mean Square Error Short Time Spectral Amplitude Estimator", IEEE Trans. Acoust., Speech, Signal Processing, Dec. 1984, vol. 32, pp. 1109-1121.

Virag, N., "Single Channel Speech Enhancement Based on Masking Properties of the Human Auditory System", IEEE Tran. Speech and Audio Processing, Mar. 1999, vol. 7, pp. 126-137.

Martin, R., "Spectral Subtraction Based on Minimum Statistics", Proc. EUSIPCO, 1994, pp. 1182-1185.

Wolfe, P.J., et al., "Efficient Alternatives to Ephraim and Malah Suppression Rule for Audio Signal Enhancement", EURASIP Journal on Applied Signal Processing, 2003, vol. 2003, Issue 10, pp. 1043-1051.

Ephraim, H., et al., "A Brief Survey of Speech Enhancement", 2005, The Electronic Handbook, CRC Press.

Cohen, I., et al., "Speech Enhancement for Non-Stationary Noise Environments", Signal Processing, Elsevier Science Publishers B.V. Amsterdam, NL, Nov. 1, 2001, vol. 81, No. 11, pp. 2403-2418.

Hirsch, H. G., et al., "Noise Estimation Techniques for Robust Speech Recognition", Acoustics, Speech, and Signal Processing, May 9, 1995 Int'l Conf. on Detroit, vol. 1, pp. 153-156.

Martin, Rainer, 'Noise Power Spectral Density Estimation Based on Optimal Smoothing and Minimum Statistics, IEEE Transactions on Speech and Audio Processing, Jul. 1, 2001, Section II, vol. 9, p. 505.

Int'l Search Report mailed Jun. 25, 2008 from European Patent Office.

* cited by examiner

NOISE VARIANCE ESTIMATOR FOR SPEECH ENHANCEMENT

TECHNICAL FIELD

The invention relates to audio signal processing. More particularly, it relates to speech enhancement and clarification in a noisy environment.

INCORPORATION BY REFERENCE

The following publications are hereby incorporated by reference, each in their entirety.

[1] Y. Ephraim and D. Malah, "Speech enhancement using a minimum mean square error short time spectral amplitude estimator," *IEEE Trans. Acoust., Speech, Signal Processing*, vol. 32, pp. 1109-1121, Dec. 1984.

[2] N. Virag, "Single channel speech enhancement based on masking properties of the human auditory system," *IEEE Tran. Speech and Audio Processing*, vol. 7, pp. 126-137, Mar. 1999.

[3] R. Martin, "Spectral subtraction based on minimum statistics," in *Proc. EUSIPCO,* 1994, pp. 1182-1185.

[4] P. J. Wolfe and S. J. Godsill, "Efficient alternatives to Ephraim and Malah suppression rule for audio signal enhancement," *EURASIP Journal on Applied Signal Processing*, vol. 2003, Issue 10, Pages 1043-1051, 2003.

[5] Y. Ephraim, H. Lev-Ari and W. J. J. Roberts, "A brief survey of Speech Enhancement," The Electronic Handbook, CRC Press, Apr. 2005.

BACKGROUND ART

We live in a noisy world. Environmental noise is everywhere, arising from natural sources as well as human activities. During voice communication, environmental noises are transmitted simultaneously with the intended speech signal, adversely effecting the quality of a received signal. This problem is mitigated by speech enhancement techniques that remove such unwanted noise components, thereby producing a cleaner and more intelligible signal.

Most speech enhancement systems rely on various forms of an adaptive filtering operation. Such systems attenuate the time/frequency (T/F) regions of the noisy speech signal having low Signal-to-Noise-Ratios (SNR) while preserving those with high SNR. The essential components of speech are thus preserved while the noise component is greatly reduced. Usually, such a filtering operation is performed in the digital domain by a computational device such as a Digital Signal Processing (DSP) chip.

Subband domain processing is one of the preferred ways in which such adaptive filtering operation is implemented. Briefly, the unaltered speech signal in the time domain is transformed to various subbands by using a filterbank, such as the Discrete Fourier Transform (DFT). The signals within each subband are subsequently suppressed to a desirable amount according to known statistical properties of speech and noise. Finally, the noise suppressed signals in the subband domain are transformed to the time domain by using an inverse filterbank to produce an enhanced speech signal, the quality of which is highly dependent on the details of the suppression procedure.

An example of a prior art speech enhancer is shown in FIG. 1. The input is generated by digitizing an analog speech signal that contains both clean speech as well as noise. This unaltered audio signal y(n), where n=0,1, . . . , ∞ is the time index, is then sent to an analysis filterbank device or function ("Analysis Filterbank") 2, producing multiple subbands signals, $Y_k(m)$, k=1,. . . , K, m=0,1, . . . , ∞, where k is the subband number, and m is the time index of each subband signal. The subband signals may have lower sampling rates compared with y(n) due to the down-sampling operation in Analysis Filterbank 2. The noise level of each subband is then estimated by using a noise variance estimator device or function ("Noise Variance Estimator") 4 with the subband signal as input. The Noise Variance Estimator 4 of the present invention differs from those known in the prior art and is described below, in particular with respect to FIGS. 2*a* and 2*b*. Based on the estimated noise level, appropriate suppression gains $g_k$ are determined in a suppression rule device or function ("Suppression Rule") 6, and applied to the subband signals as follows:

$$\tilde{Y}_k(m)=g_kY_k(m),\ k=1, \ldots, K. \quad (1)$$

Such application of the suppression gain to a subband signal is shown symbolically by a multiplier symbol 8. Finally, $\tilde{Y}_k(m)$ are sent to a synthesis filterbank device or function ("Synthesis Filterbank") 10 to produce an enhanced speech signal $\tilde{y}(n)$. For clarity in presentation, FIG. 1 shows the details of generating and applying a suppression gain to only one of multiple subband signals (k).

The appropriate amount of suppression for each subband is strongly correlated to its noise level. This, in turn, is determined by the variance of the noise signal, defined as the mean square value of the noise signal with respect to a zero-mean Gaussian probability distribution. Clearly, an accurate noise variance estimation is crucial to the performance of the system.

Normally, the noise variance is not available, a priori, and must be estimated from the unaltered audio signal. It is well-known that the variance of a "clean" noise signal can be estimated by performing a time-averaging operation on the square value of noise amplitudes over a large time block. However, because the unaltered audio signal contains both clean speech and noise, such a method is not directly applicable.

Many noise variance estimation strategies have been previously proposed to solve this problem. The simplest solution is to estimate the noise variance at the initialization stage of the speech enhancement system, when the speech signal is not present (reference [1]). This method, however, works well only when the noise signal as well as the noise variance is relatively stationary.

For an accurate treatment of non-stationary noise, more sophisticated methods have been proposed. For example, Voice Activity Detection (VAD) estimators make use of a standalone detector to determine the presence of a speech signal. The noise variance is only updated during the time when it is not (reference [2]). This method has two shortcomings. First, it is very difficult to have reliable VAD results when the audio signal is noisy, which in turn affects the reliability of the noise variance estimation result. Secondly, this method precludes the possibility to update the noise variance estimation when the speech signal is present. The latter concern leads to inefficiency because the noise variance estimation can still be reliably updated during times wherein the speech level is weak.

Another widely quoted solution to this problem is the minimum statistics method (reference [3]). In principle, the method keeps a record of the signal level of historical samples for each subband, and estimates the noise variance based on the minimum recorded value. The rationale behind this approach is that the speech signal is generally an on/off process that naturally has pauses. In addition, the signal level is usually much higher when the speech signal is present. Therefore, the minimum signal level from the algorithm is probably from a speech pause section if the record is sufficiently long in time, yielding a reliable estimated noise level. Nevertheless, the minimum statistics method has a high memory demand and is not applicable to devices with limited available memory.

DISCLOSURE OF THE INVENTION

According to a first aspect of the invention, speech components of an audio signal composed of speech and noise components are enhanced. An audio signal is transformed from the time domain to a plurality of subbands in the frequency domain. The subbands of the audio signal are subsequently processed. The processing includes adaptively reducing the gain of ones of the subbands in response to a control. The control is derived at least in part from an estimate of variance in noise components of the audio signal. The estimate is, in turn, derived from an average of previous estimates of the amplitude of noise components in the audio signal. Estimates of the amplitude of noise components in the audio signal having an estimation bias greater than a predetermined maximum amount of estimation bias are excluded from or underweighted in the average of previous estimates of the amplitude of noise components in the audio signal. Finally, the processed audio signal is transformed from the frequency domain to the time domain to provide an audio signal in which speech components are enhanced. This aspect of the invention may further include an estimation of the amplitude of noise components in the audio signal as a function of an estimate of variance in noise components of the audio signal, an estimate of variance in speech components of the audio signal, and the amplitude of the audio signal.

According to a further aspect of the invention, an estimate of variance in noise components of an audio signal composed of speech and noise components is derived. The estimate of variance in noise components of an audio signal is derived from an average of previous estimates of the amplitude of noise components in the audio signal. The estimates of the amplitude of noise components in the audio signal having an estimation bias greater than a predetermined maximum amount of estimation bias are excluded from or underweighted in the average of previous estimates of the amplitude of noise components in the audio signal. This aspect of the invention may further include an estimation of the amplitude of noise components in the audio signal as a function of an estimate of variance in noise components of the audio signal, an estimate of variance in speech components of the audio signal, and the amplitude of the audio signal.

According to either of the above aspects of the invention, estimates of the amplitude of noise components in the audio signal having values greater than a threshold in the average of previous estimates of the amplitude of noise components in the audio signal may be excluded or underweighted.

The above mentioned threshold may be a function of $\psi(1+\hat{\xi}(m))\hat{\lambda}_d(m)$, where $\hat{\xi}$ is the estimated a priori signal-to-noise ratio, $\hat{\lambda}_d$ is the estimated variance in noise components of the audio signal, and $\psi$ is a constant determined by the predetermined maximum amount of estimation bias.

The above described aspects of the invention may be implemented as methods or apparatus adapted to perform such methods. A computer program, stored on a computer-readable medium may cause a computer to perform any of such methods.

It is an object of the present invention to provide speech enhancement capable of estimating the relative strengths of speech and noise components that is operative during both the presence as well as the absence of speech.

It is a further object of the present invention to provide speech enhancement capable of estimating the relative strengths of speech and noise components despite the presence of a significant noise component.

It is yet a further object of the present invention to provide speech enhancement that is operative for devices having limited available memory.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BEST MODE FOR CARRYING OUT THE INVENTION

A glossary of acronyms and terms as used herein is given in Appendix A. A list of symbols along with their respective definitions is given in Appendix B. Appendix A and Appendix B are an integral part of and form portions of the present application.

Figure 1:
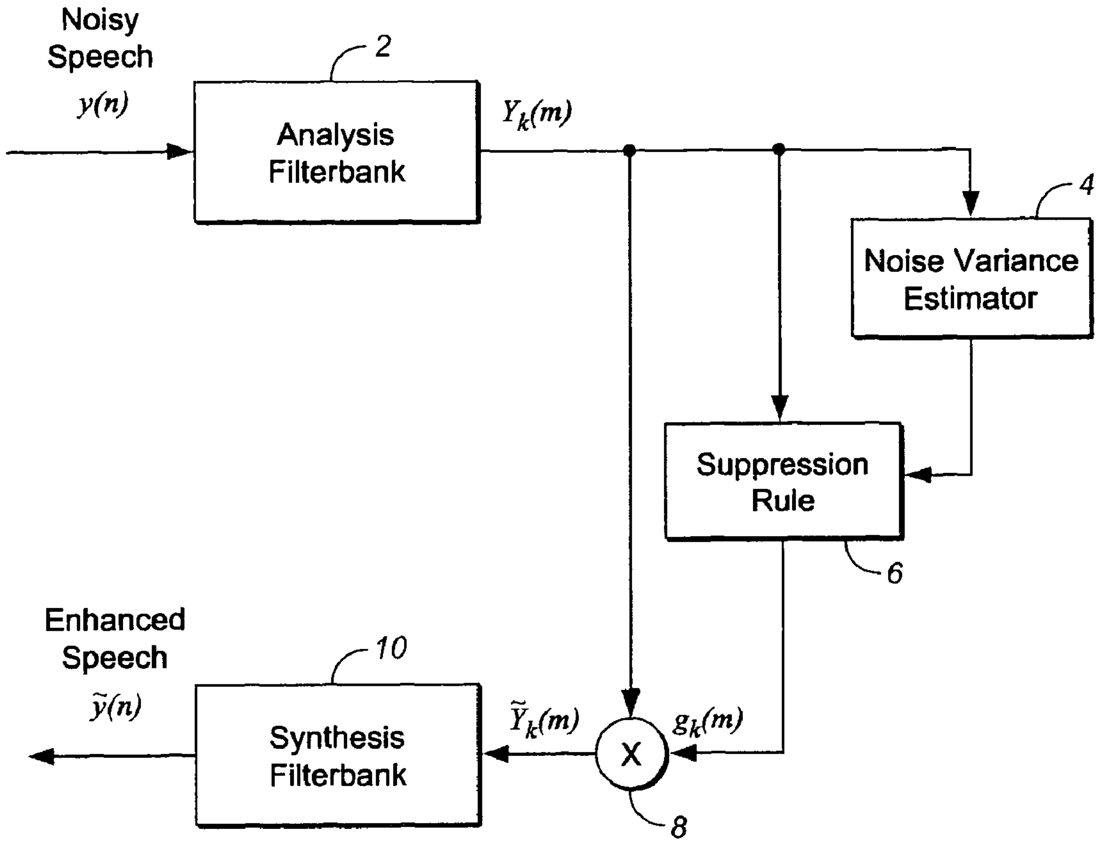
FIG. 1 is a functional block diagram showing a prior art speech enhancer.
Figure 2A:
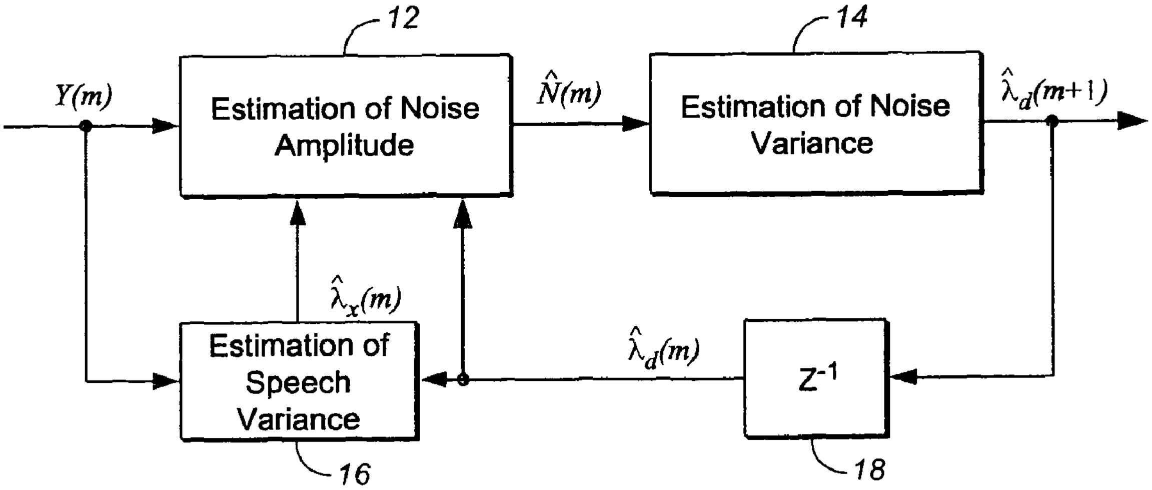
FIG. 2*a* is a functional block diagram of an exemplary noise variance estimator according to aspects of the present invention. Such noise variance estimators may be used to improve prior art speech enhancers, such as that of the FIG. 1 example, or may be used for other purposes.

A block diagram of an exemplary embodiment of a noise variance estimator according to aspects of the invention is shown in FIG. 2*a*. It may be integrated with a speech enhancer such as that of FIG. 1 in order to estimate the noise level for each subband. For example, the noise variance estimator according to aspects of the invention may be employed as the Noise Variance Estimator 4 of FIG. 1, thus providing an improved speech enhancer. The input to the noise variance estimator is the unaltered subband signal Y(m) and its output is an updated value of the noise variance estimation.

For purposes of explanation, the noise variance estimator may be characterized as having three main components: a noise amplitude estimator device or function ("Estimation of Noise Amplitude") 12, a noise variance estimate device or function that operates in response to a noise amplitude estimate ("Estimation of Noise Variance") 14, and a speech variance estimate device or function ("Estimate of Speech Variance") 16. The noise variance estimator example of FIG. 2*a* also includes a delay 18, shown using z-domain notation ("$Z^{-1}$").

Figure 2B:
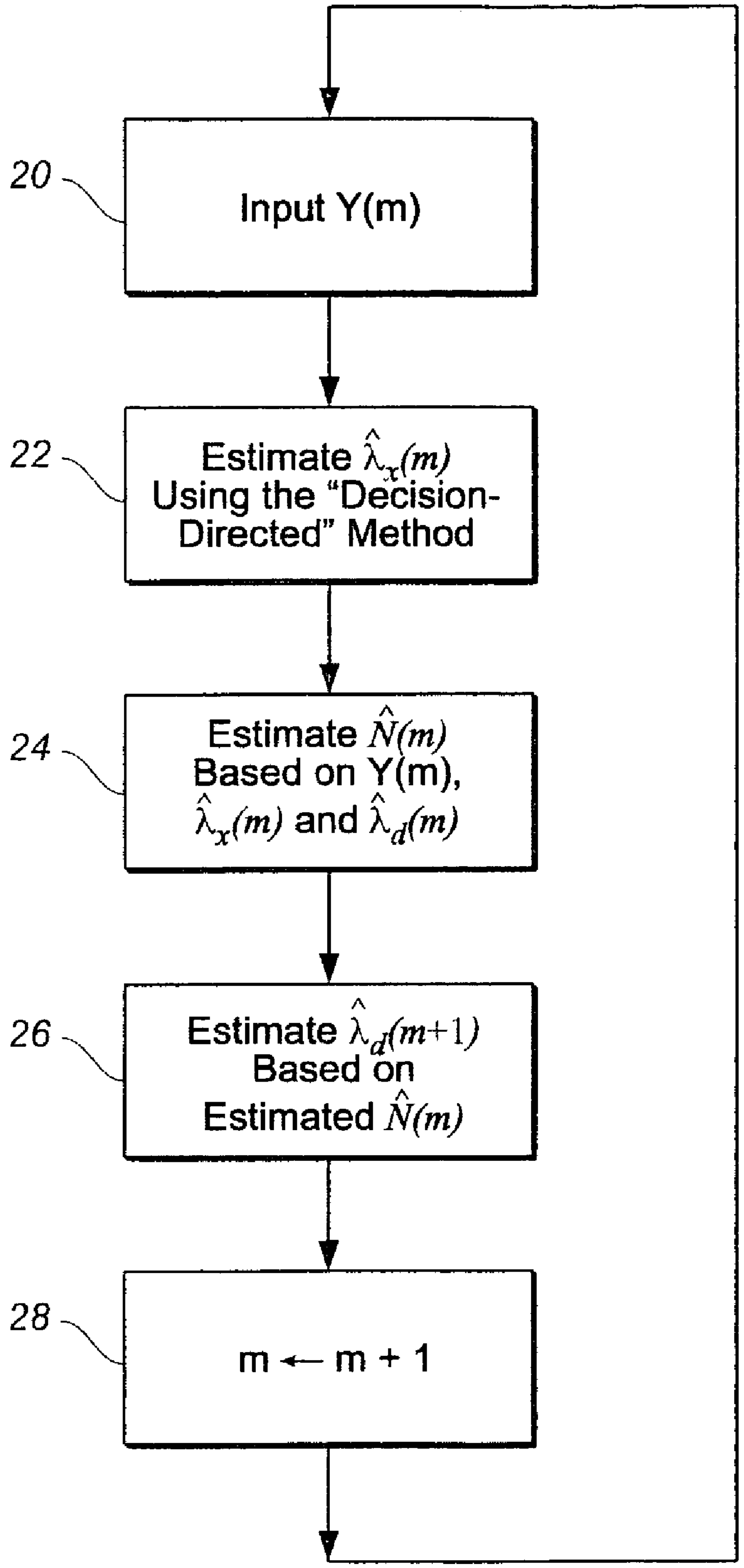
FIG. 2*b* is a flow chart useful in understanding the operation of the noise variance estimator of FIG. 2*a*.

The operation of the noise variance estimator example of FIG. 2*a* may be best understood by reference also to the flow chart of FIG. 2*b*. It will be appreciated that various devices, functions and processes shown and described in various examples herein may be shown combined or separated in ways other than as shown in the figures herein. For example, when implemented by computer software instruction sequences, all of the functions of FIGS. 2*a* and 2*b* may be implemented by multithreaded software instruction sequences running in suitable digital signal processing hardware, in which case the various devices and functions in the examples shown in the figures may correspond to portions of the software instructions.

The amplitude of the noise component is estimated (Estimation of Noise Amplitude 12, FIG. 2*a*; Estimate N(m) 24, FIG. 2*b*). Because the audio input signal contains both speech and noise, such estimation can only be done by exploiting statistical differences that distinguish one component from the other. Moreover, the amplitude of the noise component can be estimated via appropriate modification of existing statistical models currently used for estimation of the speech component amplitude (references [4] and [5]).

Such speech and noise models typically assume that the speech and noise components are uncorrelated, zero-mean Gaussian distributions. The key model parameters, more specifically the speech component variance and the noise component variance, must be estimated from the unaltered input audio signal. As noted above, the statistical properties of the speech and noise components are distinctly different. In most cases, the variance of the noise component is relatively stable. By contrast, the speech component is an "on/off" process and its variance can change dramatically even within several milliseconds. Consequently, an estimation of the variance of the noise component involves a relatively long time window whereas the analogous operation for the speech component may involve only current and previous input samples. An example of the latter is the "decision-directed method" proposed in reference [1].

Once the statistical models and their distribution parameters for the speech and the noise components have been determined, it is feasible to estimate the amplitudes of both components from the audio signal. In the exemplary embodiment, the Minimum Mean Square Error (MMSE) power estimator, previously introduced in reference [4] for estimating the amplitude of the speech component, is adapted to estimate the amplitude of the noise component. The choice of an estimator model is not critical to the invention.

Briefly, the MMSE power estimator first determines the probability distribution of the speech and noise components respectively based on statistical models as well as the unaltered audio signal. The noise amplitude is then determined to be the value that minimizes the mean square of the estimation error.

Finally in preparation for succeeding calculations, the variance of the noise component is updated by inclusion of the current absolute value squared of the estimated noise amplitude in the overall noise variance. This additional value becomes part of a cumulative operation on a reasonably long buffer that contains the current and as well as previous noise component amplitudes. In order to further improve the accuracy of the noise variance estimation, a Biased Estimation Avoidance method may be incorporated.

Estimation of the Noise Amplitude

Estimation of Noise Amplitude 12, FIG. 2*a*; Estimate N(m) 24, FIG. 2*b*

As illustrated in FIGS. 1, 2*a*, and 2*b* (20), the input to the noise variance estimator (in this context, the "noise variance estimator" is block 4 of FIG. 1 and is the combination of elements 12, 14, 16 and 18 of FIG. 2*a*) is the subband:

$$Y(m)=X(m)+D(m) \tag{2}$$

where X(m) is the speech component, and D(m) is the noise component. Here m is the time-index, and the subband number index k is omitted because the same noise variance estimator is used for each subband. One may assume that the analysis filterbank generates complex quantities, such as a DFT does. Here, the subband component is also complex, and can be further represented as and $$Y(m)=R(m)\exp(j\theta(m)) \tag{3}$$

$$X(m)=A(m)\exp(j\alpha(m)) \tag{4}$$

and $$D(m)=N(m)\exp(j\phi(m)) \tag{5}$$

where R(m), A(m) and N(m) are the amplitudes of the unaltered audio signal, speech and noise components, respectively, and θ(m), α(m) and φ(m) are their respective phases.

By assuming that the speech and the noise components are uncorrelated, zero-mean Gaussian distributions, the amplitude of X(m) may be estimated by using the MMSE power estimator derived in reference [4] as follows:

$$\hat{A}(m)=G_{SP}(\xi(m),\gamma(m))\cdot R(m) \tag{6}$$

where the gain function is given by $$G_{SP}(\xi(m),\gamma(m))=\sqrt{\frac{\xi(m)}{1+\xi(m)}\left(\frac{1+\upsilon(m)}{\gamma(m)}\right)} \tag{7}$$

where $$\upsilon(m)=\frac{\xi(m)}{1+\xi(m)}\gamma(m) \tag{8}$$

$$\xi(m)=\frac{\lambda_x(m)}{\lambda_d(m)} \tag{9}$$

and $$\gamma(m)=\frac{R^2(m)}{\lambda_d(m)} \tag{10}$$

Here $\lambda_x(m)$ and $\lambda_d(m)$ are the variances of the speech component and noise components respectively. ξ(m) and γ(m) are often interpreted as the a priori and a posteriori component-to-noise ratios, and that notation is employed herein. In other words, the "a priori" SNR is the ratio of the assumed (while unknown in practice) speech variance (hence the name "a priori) to the noise variance. The "a posteriori" SNR is the ratio of the square of the amplitude of the observed signal (hence the name "a posterori") to the noise variance.

In the MMSE power estimator model, the respective variances of the speech and noise components can be interchanged to estimate the amplitude of the noise component:

$$\hat{N}(m)=G_{SP}(\xi'(m),\gamma'(m))\cdot R(m) \tag{11}$$

where $$\xi'(m)=\frac{\lambda_d(m)}{\lambda_x(m)} \tag{12}$$

and $$\gamma'(m)=\frac{R^2(m)}{\lambda_x(m)} \tag{13}$$

Estimation of the Speech Variance

Estimation of Speech Variance 16, FIG. 2*a*; Estimate $\hat{\lambda}_x$(m) 22, FIG. 2*b*

The estimation of the speech component variance $\hat{\lambda}_x$(m) may be calculated by using the decision-directed method proposed in reference [1]:

$$\hat{\lambda}_x(m),\mu\hat{A}^2(m-1)+(1-\mu)\max(R^2(m)-\hat{\lambda}_d(m),0) \quad (14)$$

Here $$0<<\mu<1 \quad (15)$$

is a pre-selected constant, and $\hat{A}$(m) is the estimation of the speech component amplitude. The estimation of the noise component variance $\hat{\lambda}_d$(m) calculation is described below.

Estimation of the Noise Amplitude (Continued from Above)

The estimation of the amplitude of the noise component is finally given by $$\hat{N}(m) = G_{SP}\left(\hat{\xi}'(m), \hat{\gamma}'(m)\right)\cdot R(m) \quad (16)$$

where $$\hat{\xi}'(m) = \frac{\hat{\lambda}_d(m)}{\hat{\lambda}_x(m)} \quad (17)$$

and $$\hat{\gamma}'(m) = \frac{R^2(m)}{\hat{\lambda}_x(m)} \quad (18)$$

Although a complex filterbank is employed in this example, it is straightforward to modify the equations for a filterbank having only real values.

The method described above is given only as an example. More sophisticated or simpler models can be employed depending on the application. Multiple microphone inputs may be used as well to obtain a better estimation of the noise amplitudes.

Estimation of the Noise Variance

Estimation of Noise Variance 14, FIG. 2*a*; Estimate $\lambda_d$(m) 26, FIG. 2*b*

The noise component in the subband input at a given time index in is, in part, determined by its variance $\lambda_d$(m). For a zero-mean Gaussian, this is defined as the mean value of the square of the amplitude of the noise component:

$$\lambda_d(m)=E\{N^2(m)\} \quad (19)$$

Here the expectation E{N²(m)} is taken with respect to the probability distribution of the noise component at time index m.

By assuming the noise component is stationary and ergodic, $\lambda_d$(m) can be obtained by performing a time-averaging operation on prior estimated noise amplitudes. More specifically, the noise variance $\lambda_d$(m+1) of time index m+1 can be estimated by performing a weighted average of the square of the previously estimated noise amplitudes:

$$\hat{\lambda}_d(m+1) = \frac{\sum_{i=0}^{\infty} w(i)\hat{N}^2(m-i)}{\sum_{i=0}^{\infty} w(i)} \quad (20)$$

where w(i), i=0, . . . , ∞ is a weighting function. In practice w(i) can be chosen as a window of length L: w (i)=1, i=0, . . . , L−1. In the Rectangle Window Method (RWM), the estimated noise variance is given by:

$$\hat{\lambda}_d(m+1) = \frac{1}{L}\sum_{i=0}^{L-1} \hat{N}^2(m-i) \quad (21)$$

It is also possible to use an exponential window:

$$w(i)=\beta^{i+1} \quad (22)$$

where $$0<\beta<1 \quad (23)$$

In the Moving Average Method (MAM), the estimated noise variance is the moving average of the square of the noise amplitudes:

$$\hat{\lambda}_d(m+1)=(1-\beta)/\hat{\lambda}_d(m)+\beta\hat{N}_k^2(m) \quad (24)$$

where the initial value $\hat{\lambda}_d(0)$ can be set to a reasonably chosen pre-determined value.

Bias Estimation Avoidance

Occasionally, the model is unable to provide an accurate representation of the speech and noise components. In these situations, the noise variance estimation can become inaccurate, thereby producing a very biased result. The Bias Estimation Avoidance (BEA) method has been developed to mitigate this problem.

In essence, the BEA assigns a diminished weight to noise amplitude estimates $\hat{N}$(m) such that:

$$\text{bias}(m)=E\{N^2(m)-\hat{N}^2(m)\}/E\{N^2(m)\} \quad (25)$$

where the bias, bias(m), is larger than a pre-determined maximum $B_{max}$, i.e.:

$$|\text{bias}(m)|>B_{max} \quad (26)$$

The accuracy of the noise amplitude estimation $\hat{N}$(m) is subject to the accuracy of the model, particularly the variances of the speech and the noise components as described in previous sections. Because the noise component is relatively stationary, its variance evolves slowly with time. For this reason, the analysis assumes:

$$\hat{\lambda}_d(m)=\lambda_d(m) \quad (27)$$

By contrast, the speech component is transient by nature and prone to large errors. Assuming the real a priori SNR is $$\xi^*(m)=\lambda_x(m)/\lambda_d(m) \quad (28)$$

while the estimated a priori SNR is $$\hat{\xi}(m)=\hat{\lambda}_x(m)/\lambda_d(m) \quad (29)$$

the estimation bias of $\hat{N}^2(m)$ is actually given by $$\text{bias}(m) = \frac{\tilde{\xi}(m) - \xi^*(m)}{\left(1 + \tilde{\xi}(m)\right)^2} \tag{30}$$

Clearly, if $$\tilde{\xi}(m) = \xi^*(m) \tag{31}$$

one has an unbiased estimator and $$E\{\hat{N}^2(m)\}=E\{N^2(m)\}=\lambda_d(m) \tag{32}$$

Figure 3:
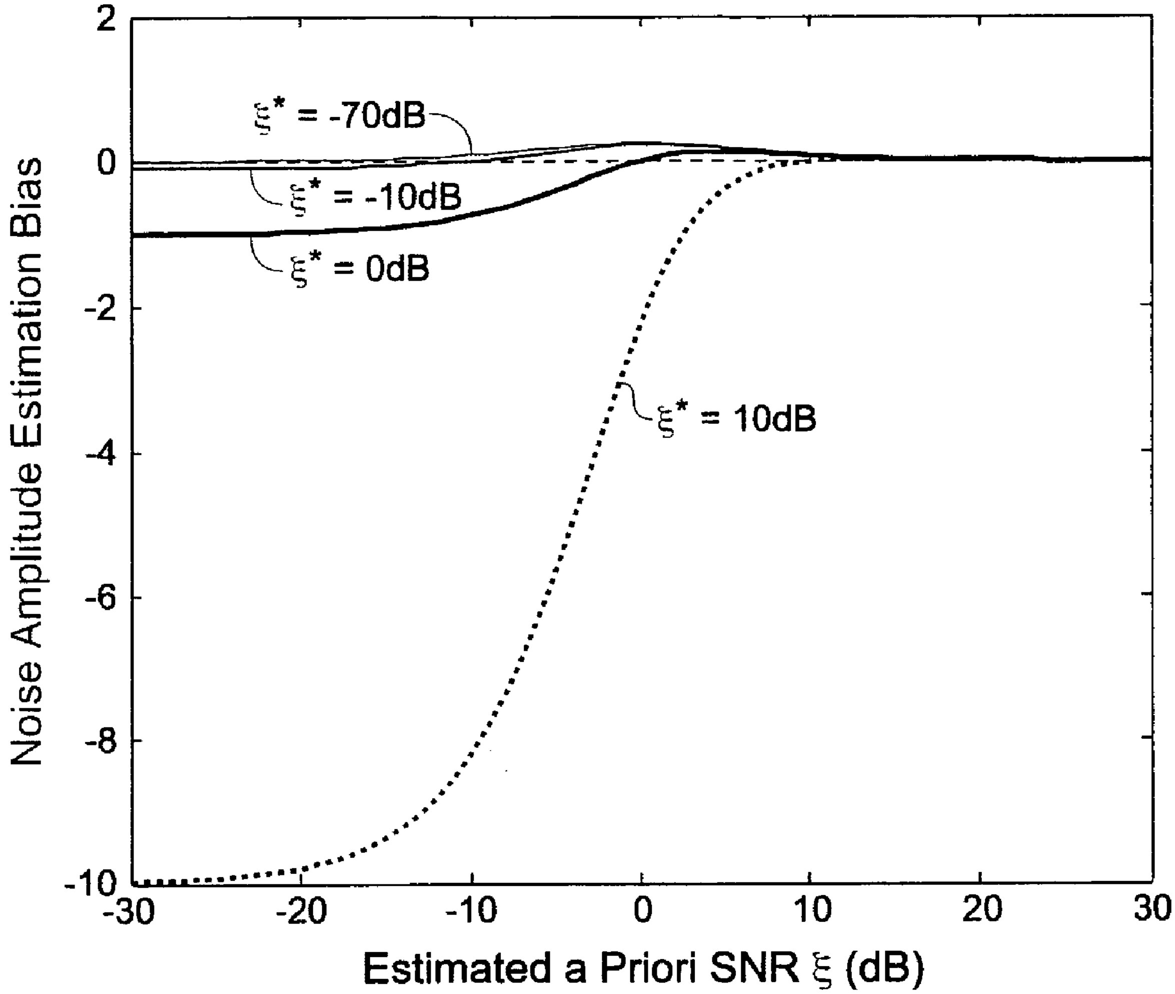
FIG. 3 shows idealized plots of estimation of bias of noise amplitude as a function of the estimated a priori SNR for four values of real SNR.

As seen in FIG. 3, the estimation bias is asymmetric with respect to the dotted line in the figure, the zero bias line. The lower portion of the plot indicates widely varying values of the estimation bias for varying values of $\xi^*$ whereas the upper portion shows little dependency on either $\tilde{\xi}$ or $\xi^*$.

For the SNR range of interest, under-estimation of noise amplitude, i.e.:

$$E\{\hat{N}^2(m)\}<E\{N^2(m)\} \tag{33}$$

will result in a positive bias, corresponding to the upper portion of the plot. As can be seen, the effect is relatively small and therefore not problematic.

The lower portion of the plot, however, corresponds to cases wherein the variance of the speech component is under-estimated, resulting in a large negative estimation bias as given by Eqn. (30), i.e.:

$$\lambda_x(m)>\hat{\lambda}_x(m) \tag{34}$$

and $$\lambda_d(m)>\hat{\lambda}_x(m) \tag{35}$$

or, alternatively $$\xi^*(m)>\tilde{\xi}(m) \tag{36}$$

and $$\tilde{\xi}(m)<1 \tag{37}$$

as well as a strong dependency on different values of $\xi^*$. These are situations in which the estimate of the noise amplitude is too large. Consequently, such amplitudes are given diminished weight or avoided altogether.

In practice, experience has taught that such suspect amplitudes R(m) satisfy:

$$R^2(m)>\psi(1+\tilde{\xi}(m))\lambda_d(m) \tag{38}$$

where $\psi$ is a predefined positive constant. This rule provides a lower bound for the bias:

$$\text{bias}(m) > 1 - \frac{1}{2}\psi \tag{39}$$

where $$\psi = 2(B_{max} + 1) \tag{40}$$

In summary, a positive bias is negligible. A negative bias is tenable if estimated noise amplitudes $\hat{N}(m)$ defined in Eqn. (16) and consistent with Eqn. (38) are given diminished weight. In practical application, since the value of $\lambda_d(m)$ is unknown, the rule of Eqn. (38) can be approximate by:

$$R^2(m) > \psi(1 + \hat{\xi}(m))\hat{\lambda}_d(m) \tag{41}$$

where $$\hat{\xi}(m) = \frac{\hat{\lambda}_x(m)}{\hat{\lambda}_d(m)} \tag{42}$$

Two such examples of the BEA method are the Rectangle Window Method (RWM) with BEA and the Moving Average Method (MAM) with BEA. In the former implementation, weight given to samples that are consistent with Eqn. (38) is zero:

$$\hat{\lambda}_d(m + 1) = \frac{1}{L}\sum_{i\in\Phi_m} \hat{N}^2(i) \tag{43}$$

where $\Phi_m$ is a set that contains L nearest $\hat{N}^2(i)$ to time index m that satisfy $$R^2(i)\leq\psi(i+\hat{\xi}(i))\hat{\lambda}_d(i) \tag{44}$$

In the latter implementation, such samples may be included with a diminished weight:

$$\hat{\lambda}_d(m + 1) = (1 - \beta)\hat{\lambda}_d(m) + \beta\hat{N}_k^2(m) \tag{45}$$

where $$\beta = \begin{cases} \beta_0 & R^2(m) \leq \psi(1 + \hat{\xi}(m))\hat{\lambda}_d(m) \\ \beta_1 & \text{else.} \end{cases} \tag{46}$$

and $$\beta_1 < \beta_0 \tag{47}$$

Completing the description of the FIG. **2*b* flowchart, the time index m is then advanced by one ("m←m+1" 56) and the process of FIG. 2*b*** is repeated.

Implementation

The invention may be implemented in hardware or software, or a combination of both (e.g., programmable logic arrays). Unless otherwise specified, the processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described herein may be order independent, and thus can be performed in an order different from that described.

APPENDIX A

Glossary of Acronyms and Terms

BEA Biased Estimation Avoidance
DFT Discrete Fourier Transform
DSP Digital Signal Processing
MAM Moving Average Method
RWM Rectangle Window Method
SNR Signal to Noise ratio
T/F time/frequency
VAD Voice Activity Detection

APPENDIX B

List of Symbols $y(n)$, $n=0, 1, \ldots, \infty$ digitized time signal
$\tilde{y}(n)$ enhanced speech signal
$Y_k(m)$, $k=1, \ldots, K$, $m=0, 1, \ldots, \infty$ subband signal k
$\tilde{Y}_k(m)$ enhanced subband signal k
$X(m)$ speech component of subband k
$D(m)$ noise component of subband k
$g_k$ suppression gain for subband k
$R(m)$ noisy speech amplitude
$\theta(m)$ noisy speech phase
$A(m)$ speech component amplitude
$\hat{A}(m)$ estimated speech component amplitude
$\alpha(m)$ speech component phase
$N(m)$ noise component amplitude
$\hat{N}(m)$ estimated noise component amplitude
$\phi(m)$ noise component phase
$G_{SP}$ gain function
$\lambda_x(m)$ speech component variance
$\hat{\lambda}_x(m)$ estimated speech component variance
$\lambda_d(m)$ noise component variance
$\hat{\lambda}_d(m)$ estimated noise component variance
$\xi(m)$ a priori speech component-to-noise ratio
$\gamma(m)$ a posteriori speech component-to-noise ratio
$\xi'(m)$ a priori noise component-to-speech ratio
$\gamma'(m)$ a posteriori noise component-to-speech ratio
$\alpha$ pre-selected constant
$\beta$ pre-selected for bias estimation

The invention claimed is:

1. A method for enhancing speech components of an audio signal composed of speech and noise components, comprising transforming the audio signal from the time domain to a plurality of subbands in the frequency domain, wherein each of said plurality of subbands is presumed to have a speech component and a noise component, said noise component having an amplitude and a variance at time index m, wherein said amplitude of the noise component is estimated by exploiting statistical differences that distinguish between the speech component and the noise component, processing each of said plurality of subbands, said processing including applying a gain factor, wherein said gain factor is derived at least in part from an estimation of said variance in noise components, wherein the estimation comprises at each time index m, updating said estimation of variance in noise components of the subband signal from an average of past estimates of the amplitude of noise components in the subband signal, and wherein said past estimates of the amplitude of noise components in the subband signal having values greater than a threshold are excluded from or underweighted in said weighted average, and transforming the processed subband signal from the frequency domain to the time domain to provide an audio signal in which speech components are enhanced.

2. A method according to claim 1 wherein the average of past estimates of the amplitude of noise components is a weighted average of the square of the past estimate of the amplitude of a noise component and the past estimated variance in noise components.

3. A method according to claim 2 wherein the weighting function of the weighted average is a preselected constant.

4. A method according to claim 1 wherein each estimate of the amplitude of noise components in the subband signal is a function of an estimate of variance in noise components of the subband signal, an estimate of variance in speech components of the subband signal, and the amplitude of the subband signal.

5. A method according to claim 1 wherein said threshold is a function of $\psi(1+\hat{\xi}(m))\hat{\lambda}_d(m)$, where $\hat{\xi}$ is the estimated a priori signal-to-noise ratio, $\hat{\lambda}_d$ is the estimated variance in noise components of the subband signal, and $\psi$ is a constant determined by a predetermined maximum amount of an estimation bias.

6. A method according to claim 5 wherein each estimate of the amplitude of noise components in the subband signal is a function of an estimate of variance in noise components of the subband signal, an estimate of variance in speech components of the subband signal, and the amplitude of the subband signal.

7. Apparatus adapted to perform the methods of any one of claims 1 through 6.

8. A non-transitory computer-readable storage medium encoded with a computer program for causing a computer to perform the method of any one of claims 1 through 6.

* * * * *